United States Patent
Kim et al.

(10) Patent No.: US 9,632,174 B2
(45) Date of Patent: Apr. 25, 2017

(54) APPARATUS FOR TESTING PERFORMANCE OF SYNTHETIC APERTURE RADAR

(71) Applicants: Se Young Kim, Daejeon (KR); Jong Hwan Lee, Daejeon (KR); Jin Bong Sung, Daejeon (KR)

(72) Inventors: Se Young Kim, Daejeon (KR); Jong Hwan Lee, Daejeon (KR); Jin Bong Sung, Daejeon (KR)

(73) Assignee: AGENCY FOR DEFENSE DEVELOPMENT (KR)

( * ) Notice: Subject to any disclaimer, the term of this patent is extended or adjusted under 35 U.S.C. 154(b) by 669 days.

(21) Appl. No.: 13/867,205

(22) Filed: Apr. 22, 2013

(65) Prior Publication Data
US 2014/0070981 A1 Mar. 13, 2014

(30) Foreign Application Priority Data
Sep. 13, 2012 (KR) .................... 10-2012-0101732

(51) Int. Cl.
*G01S 7/40* (2006.01)
*G01S 13/90* (2006.01)

(52) U.S. Cl.
CPC .......... *G01S 7/4056* (2013.01); *G01S 7/4052* (2013.01); *G01S 13/90* (2013.01); *G01S 2007/4095* (2013.01)

(58) Field of Classification Search
CPC . G01S 13/90–13/9035; G01S 7/4052–7/4056; G01S 2007/406–2007/4095
See application file for complete search history.

(56) References Cited

U.S. PATENT DOCUMENTS 2,692,442 A * 10/1954 Roberts .................... G01S 7/40
                                                        318/692
4,450,447 A *  5/1984 Zebker .................. G01S 7/4052
                                                        342/171
(Continued)

OTHER PUBLICATIONS

Minoru Shibata ; Haruo Notoh; Avionics Simulator. Proc. SPIE 2741, Technologies for Synthetic Environments: Hardware-in-the-Loop Testing, 366 (May 24, 1996); doi:10.1117/12.241115.*

*Primary Examiner* — Matthew M Barker
(74) *Attorney, Agent, or Firm* — Ostrolenk Faber LLP

(57) ABSTRACT

An apparatus for testing the performance of a synthetic aperture radar is provided. The apparatus for testing the performance of a synthetic aperture radar includes: a three-axis motion platform that is coupled to an antenna and driven in roll, pitch, and yaw directions so as to reproduce motion components generated from a pointing plane of the antenna; a target simulator configured to reproduce a ground target; and a system simulator that allows the three-axis motion platform and the target simulator to work in conjunction with each other in real time, and controls the three-axis motion platform and the target simulator. Here, the three-axis motion platform may include a three-axis driver that determines the attitude of the three-axis motion platform, based on position and speed information received from the system simulator. The target simulator may include a target modulator that adjusts the amplitude of an output signal, performs range and phase delays, and reproduces a Doppler component, based on simulation target information received from the system simulator.

4 Claims, 6 Drawing Sheets

(56) References Cited

U.S. PATENT DOCUMENTS

| | | | | |
|---|---|---|---|---|
| 4,860,016 A | * | 8/1989 | Westphal | F41G 7/003 |
| | | | | 342/165 |
| 5,223,840 A | * | 6/1993 | Cronyn | G01S 7/4052 |
| | | | | 342/170 |
| 5,247,843 A | * | 9/1993 | Bryan | F42B 35/00 |
| | | | | 250/492.1 |
| 6,346,909 B1 | * | 2/2002 | Johnson, Jr. | G01S 13/767 |
| | | | | 342/167 |
| 7,327,308 B2 | * | 2/2008 | Cheng | G01S 7/4056 |
| | | | | 342/101 |
| 7,365,677 B2 | * | 4/2008 | Tsunoda | G01R 29/0821 |
| | | | | 342/165 |
| 7,978,126 B2 | * | 7/2011 | Tsunoda | G01S 7/4004 |
| | | | | 342/165 |
| 9,151,828 B2 | * | 10/2015 | Shipley | G01S 7/4052 |
| 2013/0191102 A1 | * | 7/2013 | Chang | G06G 7/62 |
| | | | | 703/13 |

* cited by examiner under U.S. 9,632,174 B2

APPARATUS FOR TESTING PERFORMANCE OF SYNTHETIC APERTURE RADAR

CROSS-REFERENCE TO RELATED APPLICATIONS

Pursuant to 35 U.S.C. §119(a), this application claims the benefit of earlier filing date and right of priority to Korean Application No. 10-2012-0101732, filed on Sep. 13, 2012, the contents of which is incorporated by reference herein in its entirety.

BACKGROUND OF THE INVENTION

1. Field of the Invention

The present invention relates to an apparatus for testing the performance of a synthetic aperture radar.

2. Description of the Conventional Art

An imaging radar is a system in which a radar transmits and receives electromagnetic waves through an antenna while relatively moving with respect to a fixed ground target and synthesizes an image based on Doppler information of the ground target. To accurately measure the performance of such an imaging radar, a flight test is essentially needed. If it is possible to sequentially reproduce Doppler components received from the ground target in proportion to an antenna beam width every pulse repetition interval, an azimuth resolution test required for the imaging radar can be performed.

A conventional radar test apparatus performs a ground test, with its role being limited to such function as delaying the relative distance between a ground target and a radar, reproducing RCS, and reproducing platform speed and angular information using a Doppler. Also, the conventional radar test apparatus was problematic in that it is not applicable to a system, such as an imaging radar, having a broad instantaneous bandwidth, and pulse stability, which is required for a high-resolution test, is not taken into account.

Unlike the conventional radar, the imaging radar requires technical differences with the conventional radar test apparatus because it has to synthesize an accurate image of a ground target. Specifically, the test apparatus for the imaging radar requires pulse stability for range and azimuth resolution tests of the imaging radar, the function of reproducing the range curvature between the ground target art the imaging radar, the function of reproducing motion generated during the flight of the imaging radar, and pulse-to-pulse phase modulation characteristics.

SUMMARY OF THE INVENTION

Therefore, it is an object of the present invention to provide an apparatus for testing the performance of a synthetic aperture radar, which is capable of testing the performance of a synthetic aperture radar from the ground in real time.

An apparatus for testing the performance of a synthetic aperture radar according to an embodiment of the present invention includes: a three-axis motion platform that is coupled to an antenna and driven in roll, pitch, and yaw directions so as to reproduce motion components generated from a pointing plane of the antenna; a target simulator configured to reproduce a ground target; and a system simulator that allows the three-axis motion platform and the target simulator to work in conjunction with each other in real time, and controls the three-axis motion platform and the target simulator. Here, the three-axis motion platform may include a three-axis driver that determines the attitude of the three-axis motion platform, based on position and speed information received from the system simulator. The target simulator may include a target modulator that adjusts the amplitude of an output signal, performs range and phase delays, and reproduces a Doppler component, based on simulation target information received from the system simulator.

In the embodiment, the system simulator may variably set system parameters according to an operation mode, and include a result analyzer that analyzes data obtained from the three-axis motion platform and the target simulator according to the system parameter sets.

In the embodiment, the apparatus for testing the performance of the synthetic aperture radar may generate a chirp signal at a predetermined timing based on the system parameters.

In the embodiment, the system simulator may create a scenario according to the operation mode, and distribute the created scenario to an SAR payload, the three-axis motion platform, and the target simulator.

In the embodiment, the created scenario may have position and speed information for determining the attitude of the three-axis motion platform and simulation target information for allowing the target simulator to reproduce a ground target.

In the embodiment, the apparatus for testing the performance of the synthetic aperture radar may calculate the geometry between the SAR payload and the ground target based on the scenario received from the system simulator, and input pointing angle calculated from geometry into a servo controller within the SAR payload.

In the embodiment, the servo controller may drive the SAR antenna at a elevation angle and an azimuth angle, based on the received pointing angle information.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
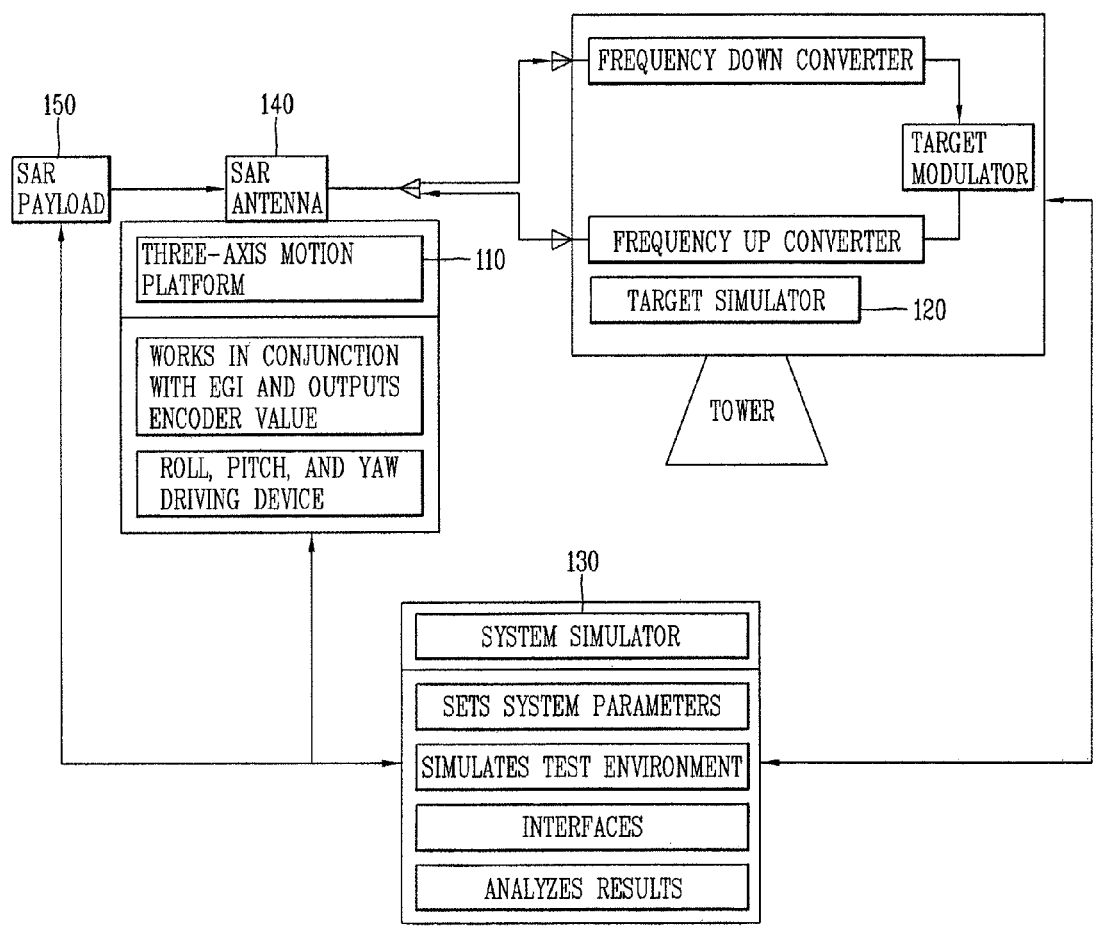
FIG. 1 is a block diagram showing an apparatus for testing the performance of a synthetic aperture radar according to an embodiment of the present invention.

Hereinafter, exemplary embodiments will be described in detail with reference to the accompanying drawings such that those skilled in the art can easily carry out the present invention. As those skilled in the art would realize, the described embodiments may be modified in various different ways, all without departing from the spirit or scope of the present invention. To clearly describe the exemplary embodiments, parts not related to the description are omitted, and like reference numerals designate like constituent elements throughout the specification.

FIG. 1 is a block diagram showing an apparatus for testing the performance of a synthetic aperture radar according to an embodiment of the present invention. The apparatus for testing the performance of the synthetic aperture radar includes a three-axis motion platform 110, a target simulator 120, and a system simulator 130.

The performance of a synthetic aperture radar (hereinafter, referred to as 'SAR') payload 150 may be affected by motion of the SAR payload 150 and the SAR Antenna 140. Accordingly, motion components of the aircraft need to be reproduced in order to accurately analyze the performance of the SAR payload 150.

Motion components generated during image acquisition may be classified into jitter components, which are motion components of a pointing angle of an SAR antenna 140, and drift components, which are motion components generated when moving away from a flight path.

Referring to FIG. 1, the three-axis motion platform 110 may be coupled to the SAR antenna 140. The three-axis platform 110 is configured to reproduce the jitter components generated from the attitude of the SAR payload 150 and the pointing plane of the SAR antenna 140.

The three-axis motion platform 110 may be controlled to be driven in the directions of roll, pitch, and yaw. To this end, the three-axis motion platform 110 may include a three-axis driver for determining the attitude of the three-axis motion platform 110 based on position and speed information received from the system simulator 130.

The three-axis motion platform 110 may work in conjunction with an EGI (Embedded GPS INS) simulator, and may output an encoder value from each axis in the case of three-axis control.

The target simulator 120 is configured to reproduce a ground target. The target simulator 120 has wideband frequency characteristics so as to perform range and azimuth resolution tests. The target simulator 120 may include a target modulator that adjusts the amplitude of an output signal, performs range and phase delays, and reproduces Doppler components, based on target simulation information received from the system simulator 130.

Specifically, the target modulator is capable of range delay so as to reproduce the geometric distance between the ground target and the SAR payload 150, and also capable of amplitude adjustment so as to simulate the reflection characteristics of the ground target and the gain characteristics of the SAR antenna 140. Moreover, the target modulator is capable of Doppler modulation so as to reproduce the speed component and azimuth resolution of the ground target.

The system simulator 130 allows the three-axis motion platform 110 and the target simulator 120 to work in conjunction with each other in real time, and is able to control the three-axis motion platform 110 and the target simulator 120.

Specifically, the system simulator is able to variably set system parameters according to SAR operation mode. The system simulator 130 may include a result analyzer that analyzes data obtained from the three-axis motion platform 110 and the target simulator 120 according to the system parameter sets.

Moreover, the system simulator 130 can perform a test environment construction for simulating a flight path, motion, etc and an interface function used to test the functionality and performance of each device.

Figure 2:
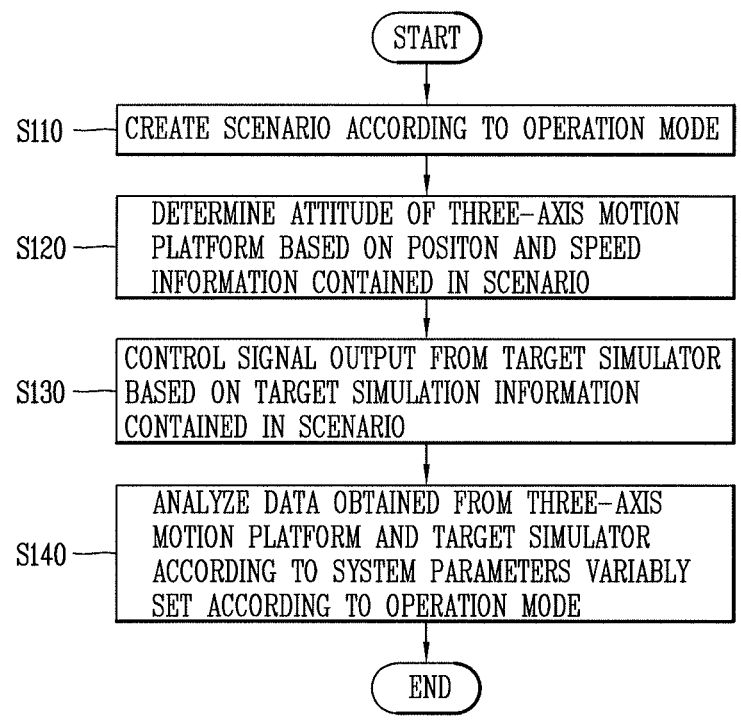
FIG. 2 is a sequential view showing a method for testing the performance of the synthetic aperture radar of FIG. 1.

FIG. 2 is a sequential view showing a test method for the synthetic aperture radar of FIG. 1. The apparatus for testing the performance of the synthetic aperture radar includes a three-axis motion platform 110 (see FIG. 1), a target simulator 120 (see FIG. 1), and a system simulator 130 (see FIG. 1).

Referring to FIG. 2, first of all, the step S110 of creating a scenario according to an operation mode is carried out.

The system simulator 130 is able to variably set system parameters according to SAR operation mode. Also, the system simulator 130 can create a scenario according to an operation mode, and distribute the created scenario to the SAR payload 150 (see FIG. 1), the three-axis motion platform 110, and the target simulator 120.

The scenario contains position and speed information for determining the attitude of the three-axis motion platform 110 and target simulation information for allowing the target simulator 120 to reproduce a ground target.

Next, the step S120 of determining the attitude of the three-axis motion platform 110 based on the position and speed information contained in the scenario is carried out.

The three-axis motion platform 110 may be controlled to be driven in the directions of roll, pitch, and yaw. A three-axis driver included in the three-axis motion platform 110 can determine the attitude of the three-axis motion platform 110 based on the position and speed information received from the system simulator 130. Accordingly, the three-axis motion platform 110 is able to reproduce motion components generated from the pointing plane of the SAR antenna 140 (see FIG. 1).

Afterwards, the step S130 of controlling a signal output from the target simulator 120 based on the simulation target information contained in the scenario is carried out.

The target simulator 120 can adjust the amplitude of an output signal, perform range and phase delays, and reproduce Doppler components, based on target simulation information received from the system simulator 130. Accordingly, the target simulator 120 is able to reproduce a ground target.

Next, the step S140 of analyzing data obtained from the three-axis motion platform 110 and the target simulator 120 according to system parameters variably set according to an operation mode is carried out.

The result analyzer included in the system simulator 130 can analyze the data obtained from the three-axis motion platform 110 and the target simulator 120 according to the system parameter sets. The user is able to analyze test results of the performance of the SAR payload 150 based on the analyzed data.

As described above, according to the present invention, the three-axis motion platform 110 can reproduce the position, speed, and attitude of the SAR payload 150, and the target simulator 120 can reproduce a ground target. Therefore, a performance test for the SAR payload 150 can be performed on the ground in real time through control over the three-axis motion platform 110 and the target simulator 120.

Accordingly, the user is able to design an optimum imaging radar through the development of hardware and algorithms by simulating a motion occurring during a flight test. As a result, the cost, time, and technical difficulty associated with the development of an imaging radar can be significantly reduced.

Figure 3:
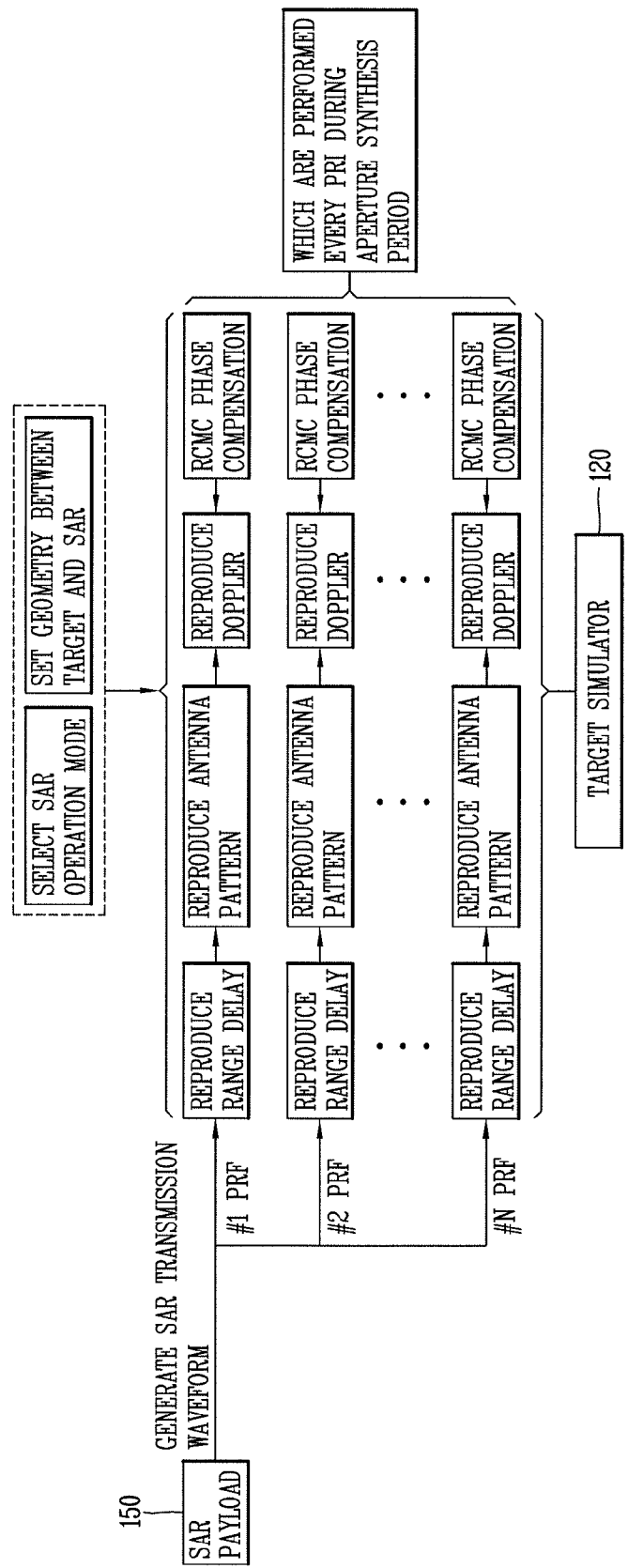
FIG. 3 is a conceptual view showing a ground target simulation process of the target simulator of FIG. 1.

FIG. 3 is a conceptual view showing a ground target simulation process of the target simulator 120 of FIG. 1.

The system simulator 130 (see FIG. 1) can variably set system parameters according to SAR operation mode. Afterwards, the SAR payload 150 can generate a wideband chirp waveform signal S(t) which can satisfy the range resolution requirement, based on the system parameters. The generated S(t) is as shown in the following Equation 1:

$$S(t)=A_0\exp\{j\pi K_r t^2\} \quad \text{[Equation 1]}$$

Where $A_O$ denotes the amplitude of an output signal, $K_r$ denotes the transmission bandwidth versus transmission pulse width, and t denotes the pulse width of an output signal.

When the chirp waveform signal S(t) is received into the target simulator 120, the chirp waveform signal S(t) can be reproduced for each η every pulse repetition interval (PRI), as shown in the following Equation 2, by using the range delay reproduction function for reproducing the range R(η) between the SAR payload 150 and the ground target:

$$S(t)=A_0\exp\{j\pi K_r(t-2R(\eta)/c)^2\} \quad \text{[Equation 2]}$$

where c denotes the speed of light.

An antenna pattern $\omega_a(\eta)$ reproduced during an image synthesis period is defined by $\text{Sinc}^2$ (0.886θ(η)/$\beta_{bw}$), where $\beta_{bw}$ denotes an azimuth beamwidth. For a range delay replica signal, when the antenna pattern component is reproduced, the chirp waveform signal S(t) can be reproduced by the following $$S(t)=A_0\omega_a(\eta)\exp\{j\pi K_r(t-2R(\eta)/c)^2\} \quad \text{[Equation 3]}$$

Besides, by reproducing Doppler components in the azimuth direction, finally the chirp waveform signal S(t) can be reproduced by the following Equation 4:

$$S(t)=A_0\omega_a(\eta)\exp\{j\pi K_r(t-2R(\eta)/c)^2\}\exp(-j4\pi f_0 R(\eta)/c) \quad \text{[Equation 4]}$$

Here, when the RCMC (Range Cell Migration Compensation) component is reproduced, a range delay can be reproduced according to R(η); however, a stepped distance function is reproduced according to a range delay resolution. Thus, an SAR signal is finally reproduced by compensating the phase component of a theoretical distance value.

Figure 4:
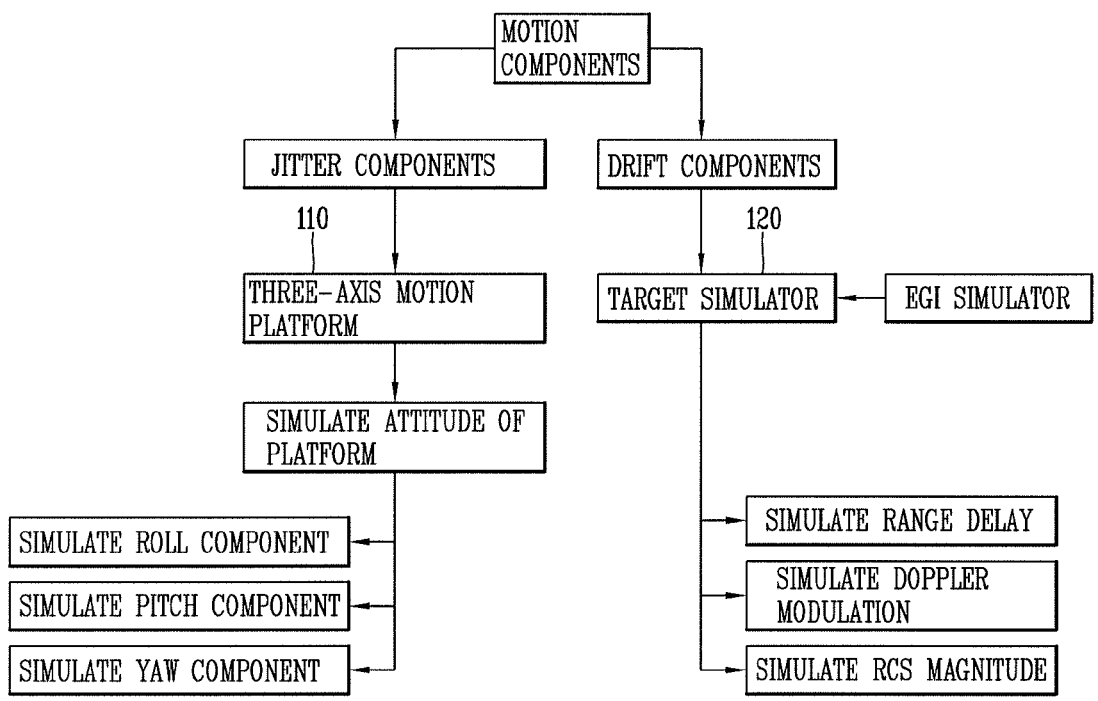
FIG. 4 is a conceptual view showing a motion simulation process according to FIG. 1.

FIG. 4 is a conceptual view showing a motion simulation process according to FIG. 1.

Referring to FIG. 4, the motion components generated during image acquisition with the SAR payload mounted on an aircraft are simulated.

The motion components generated during image acquisition may be classified into jitter components, which are motion components of the pointing angle of an SAR antenna 140 (see FIG. 1), and drift components, which are motion components generated when moving away from a flight path. The three-axis motion platform 110 can reproduce the jitter components, and the target simulator 120 can reproduce the drift components.

Specifically, the jitter components can be reproduced by performing attitude control on the roll, pitch, and yaw components, i.e., the three axes, with the use of the three-axis motion platform 110. Also, most of the drift components are not rotating components, but axially moving components. Hence, the drift components can be represented by reproducing the range delay function of the target simulator 120 according to the flight path received from the EGI simulator.

Figure 5:
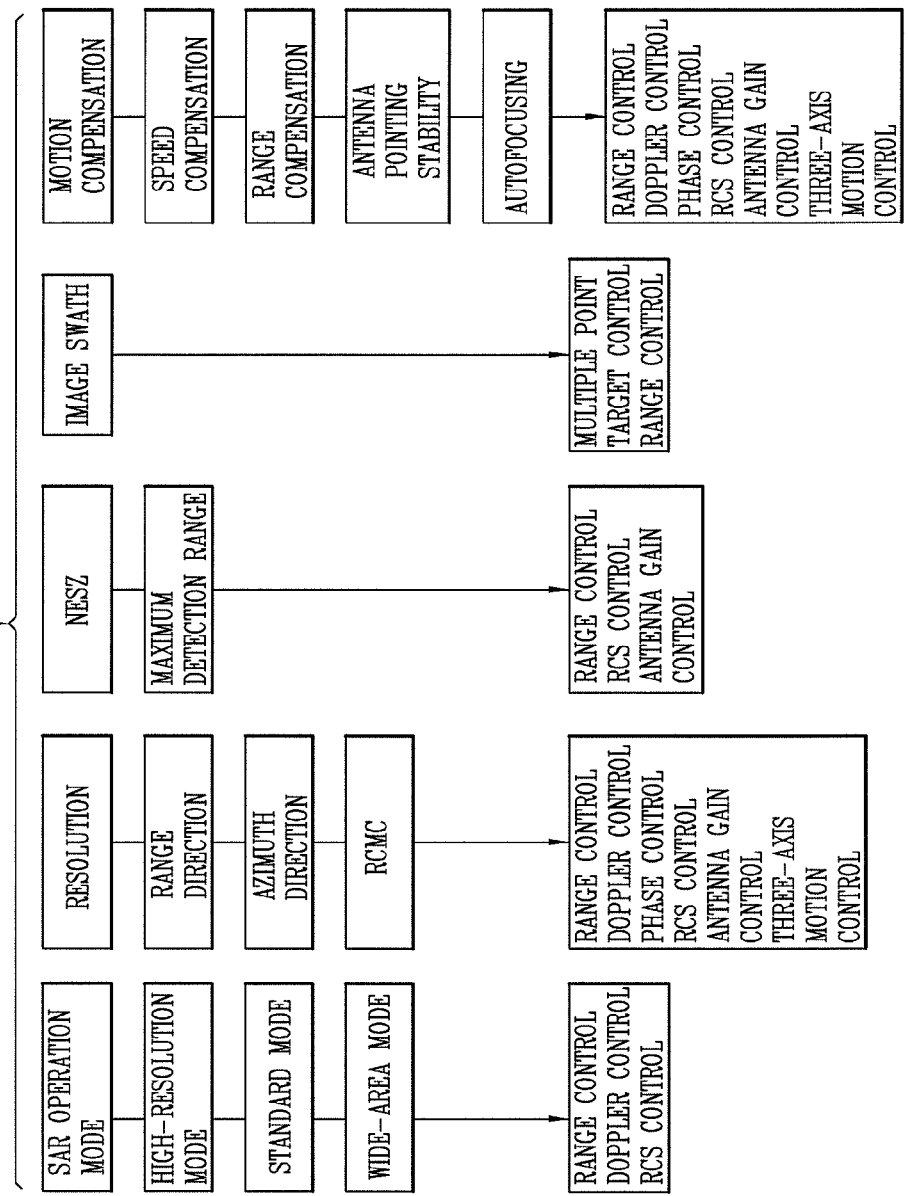
FIG. 5 is a conceptual view showing the performance measure and primary functions of the apparatus for testing the performance of the synthetic aperture radar of FIG. 1.

FIG. 5 is a conceptual view showing the performance measure and primary functions of the apparatus for testing the performance of the synthetic aperture radar of FIG. 1.

By using the apparatus for testing the performance of the synthetic aperture radar according to the present invention, tests can be performed on a high resolution mode, a standard mode, and a wide area mode, which are SAR operation modes.

According to the present invention, a resolution test defined in range and azimuth directions and an RCMC, which is a technique for compensating the range migration component, can be performed on each of the operation modes.

According to the present invention, performance relative to maximum detection range can be verified by a test on the NESZ (noise equivalent sigma zero) parameter representing the system sensitivity.

According to the present invention, an image swath test can be performed by generating multiple point targets across the width of an image acquired according to SAR operation mode, and controlling them in the range direction.

According to the present invention, a motion compensation test can be performed. The motion compensation test provides the function of reproducing a flight speed that changes every PRI. The difference between a linear flight path and a deviated flight path can be reproduced by the range control function. Also, antenna pointing stability can be verified by simulating a motion of the SAR antenna plane caused by a motion occurring at the aircraft. Finally, according to the present invention, data for verifying an autofocusing function can be simulated.

Figure 6:
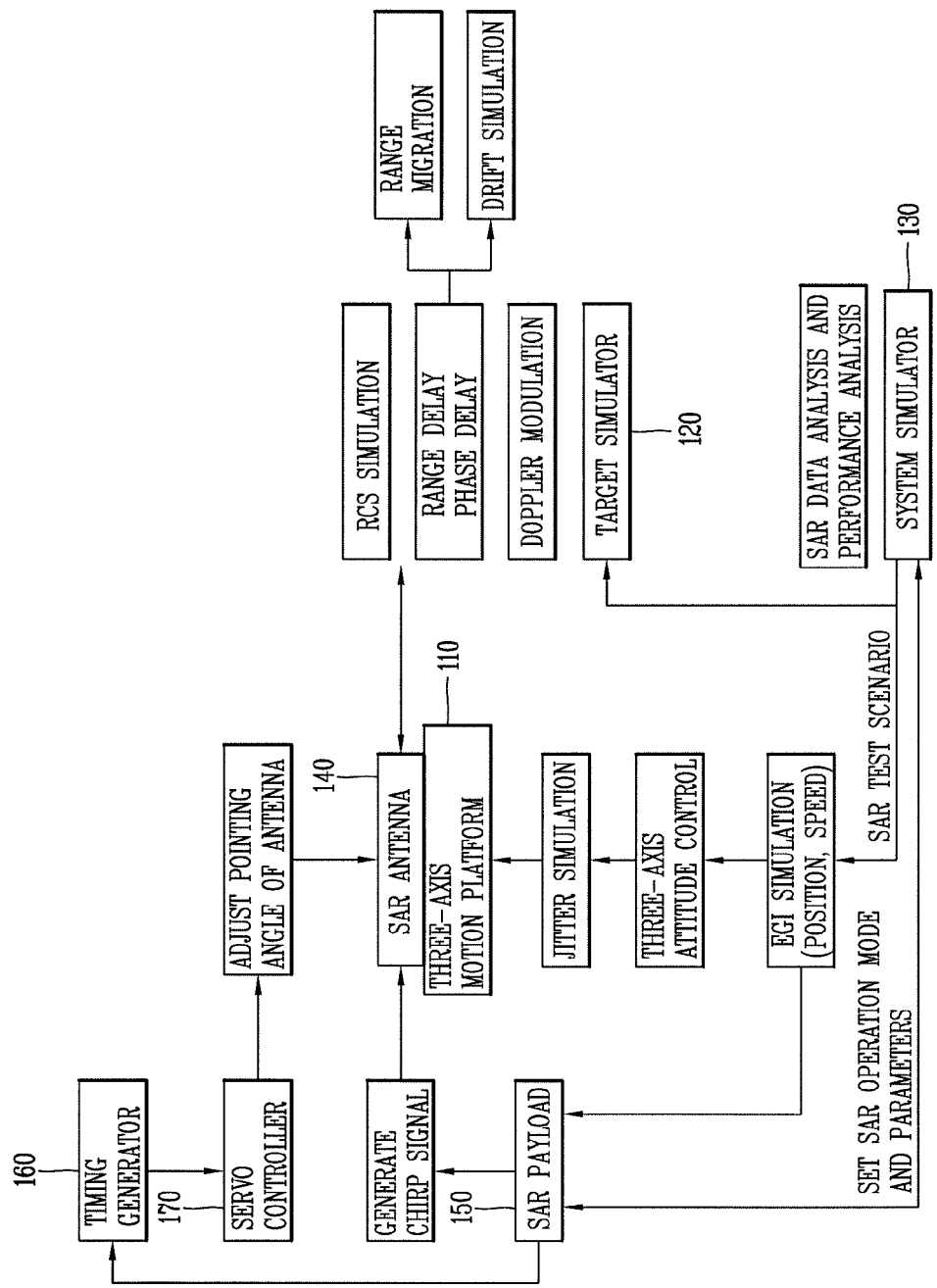
FIG. 6 is a conceptual view showing an operation of the apparatus for testing the performance of the synthetic aperture radar of FIG. 1.

FIG. 6 is a conceptual view showing an operation of the apparatus for testing the performance of the synthetic aperture radar of FIG. 1. The apparatus for testing the performance of the synthetic aperture radar includes a three-axis motion platform 110, a target simulator 120, and a system simulator 130.

Referring to FIG. 6, the system simulator 130 calculates information on the setting of system parameters and SAR operation mode, and provides it to the SAR payload 150. The SAR payload 150 can generate a chirp signal at a predetermined timing, based on the system parameters.

Moreover, the system simulator 130 creates a scenario required for an SAR test, i.e., a scenario for each operation mode, and provides it to the EGI simulator and the target simulator 120. The EGI simulator can transmit the received scenario to the SAR payload 150 and the three-axis motion platform.

The SAR payload 150 receives EGI simulation data for each scenario, calculates the geometry between the SAR payload 150 and the ground target within a timing generator 160, and inputs pointing angle information of the SAR antenna 140, among the calculated geometry, into a servo controller 170. Afterwards, the servo controller 170 is able to drive the SAR antenna 140 at an elevation angle and an azimuth angle, based on the received pointing angle information.

The attitude of the three-axis motion platform 110 can be controlled on three axes, based on position and speed information provided from the EGI simulator. Accordingly, the three-axis motion platform 110 can reproduce the jitter components among the motion components.

The target simulator 120 receives a scenario from the system simulator 130, performs signal amplitude adjustment in order to reproduce the RCS (Radar Cross Section) of the ground target, performs range and phase delays in order to reproduce the range migration component and the drift components, among the motion components, and reproduces the Doppler component for testing the speed component and azimuth resolution of the ground target.

The above-described apparatus for testing the performance of the synthetic aperture radar is not limited to the configuration and method of the above-described embodiments, but the embodiments may be configured by selectively combining all the embodiments or some of the embodiments so that various modifications can be made.

What is claimed is:

1. An apparatus for testing the performance of a synthetic aperture radar configured to synthesize an image based on Doppler information of the target, the apparatus comprising:
 a three-axis motion platform that is coupled to an antenna and driven in roll, pitch, and yaw directions and produces jitter components so as to reproduce motion components generated from a pointing angle of the antenna;
 a target simulator configured to reproduce a ground target; and
 a system simulator that allows the three-axis motion platform and the target simulator to work in conjunction with each other in real time, and that controls the three-axis motion platform and the target simulator,
 wherein the three-axis motion platform is configured to produce the jitter components by performing attitude control on the roll, pitch, and yaw components and,
 the three-axis motion platform comprises a three-axis driver that determines the attitude of the three-axis motion platform, based on jitter information received from the system simulator,
 wherein the target simulator is configured to:
 receive an input signal propagated from the antenna; and
 reproduce an output signal in order to simulate the target based on the target information received from the system simulator; and
 wherein the target simulator comprises a target modulator that adjusts the amplitude of the output signal, and
 wherein the target simulator is configured to:
 perform range and phase delays of the output signal, and reproduce drift components by reproducing the range delay function;
 reproduce a chirp waveform signal for every η (Pulse Repetition Interval: PRI);
 reproduce an antennae pattern component;
 reproduce the chirp waveform signal for a range delay replica signal when the antenna pattern component is reproduced, and
 reproduce phase components corresponding to the doppler components for every η(PRI) history of the ground target in an azimuth direction by the equation $S(t) = A_0 \omega_a(\eta) \exp\{j\pi K_r(t-2R(\eta)/c)^2\} \exp(-j4\pi f_0 R(\eta)/c)$ where the S(t) is the chirp waveform signal including the range delay replica signal and the phase components, $\exp(-j4\pi f_0 R(\eta)/c)$, corresponding to the doppler component of the ground target in the azimuth direction which is reproduced for every η(PRI), and where the $A_0 \omega_a(\eta) \exp\{j\pi K_r(t-2R(\eta)/c)^2\}$ is the chirp waveform signal for a range delay replica signal, and where the $f_0$ is a reference frequency of the output signal.

2. The apparatus of claim 1, wherein the system simulator variably sets system parameters according to an operation mode, and comprises a result analyzer that analyzes data obtained from the three-axis motion platform and the target simulator according to the system parameter sets.

3. The apparatus of claim 2, wherein the system simulator creates a scenario according to the operation mode, and transmits the created scenario to an SAR payload, the three-axis motion platform, and the target simulator.

4. The apparatus of claim 3, wherein the created scenario contains position and speed information for determining the attitude of the three-axis motion platform and target simulation information for allowing the target simulator to reproduce a ground target.

* * * * *